US012256350B1

United States Patent
Ghosh et al.

(10) Patent No.: US 12,256,350 B1
(45) Date of Patent: Mar. 18, 2025

(54) SYSTEM TO DETERMINE PULSE PER SECOND TIMING

(71) Applicant: AMAZON TECHNOLGIES, INC., Seattle, WA (US)

(72) Inventors: Arunabha Ghosh, Bellevue, WA (US); Vikram Chandrasekhar, San Jose, CA (US); Tanim Mohammed Abu Taher, Round Rock, TX (US)

(73) Assignee: AMAZON TECHNOLGIES, INC., Seattle, WA (US)

( * ) Notice: Subject to any disclaimer, the term of this patent is extended or adjusted under 35 U.S.C. 154(b) by 407 days.

(21) Appl. No.: 17/658,338

(22) Filed: Apr. 7, 2022

(51) Int. Cl.
*H04W 56/00* (2009.01)
*G01S 19/25* (2010.01)
*H04B 7/185* (2006.01)

(52) U.S. Cl.
CPC ....... *H04W 56/0015* (2013.01); *G01S 19/256* (2013.01); *H04B 7/18513* (2013.01); *H04W 56/0045* (2013.01)

(58) Field of Classification Search
CPC .......... H04W 56/0015; H04W 56/0045; G01S 19/256; H04B 7/18513
See application file for complete search history.

(56) References Cited

U.S. PATENT DOCUMENTS

| | | | | |
|---|---|---|---|---|
| 10,180,498 B1 * | 1/2019 | Kim | | G01S 19/03 |
| 10,375,108 B2 * | 8/2019 | Schweitzer, III | ... | G06F 11/0709 |
| 2012/0050100 A1 * | 3/2012 | Huang | | G04R 40/06 |
| | | | | 342/357.31 |
| 2014/0114608 A1 * | 4/2014 | Achanta | | G04F 10/10 |
| | | | | 702/176 |
| 2014/0321513 A1 * | 10/2014 | Orejas | | H03J 1/0008 |
| | | | | 375/149 |
| 2015/0185329 A1 * | 7/2015 | Shimada | | G01S 19/42 |
| | | | | 342/357.51 |
| 2015/0281809 A1 * | 10/2015 | Foster, III | | H04Q 9/00 |
| | | | | 340/870.26 |
| 2018/0011199 A1 * | 1/2018 | Lombardi | | G01S 19/14 |

(Continued)

OTHER PUBLICATIONS

"Global Positioning System", Field Manual, vol. 2, Chapter 25, pp. 439-463. Retrieved from the Internet: URL: https://www.usbr.gov/tsc/techreferences/mands/geologyfieldmanual-vol2/Chapter25.pdf.

(Continued)

*Primary Examiner* — Bailor C Hsu
(74) *Attorney, Agent, or Firm* — Lindauer Law, PLLC

(57) ABSTRACT

Satellites communicate with user terminals (UTs) based on accurate timing. A UT clock provides a pulse per second (PPS) signal to coordinate operation of the UT, such as transmitting data on an uplink at specified times. The clock may be disciplined by an external source that provides accurate and precise true time, such as a global navigation satellite system. The external source may sometimes be unavailable. The UT uses information about its location, satellite location, the ephemeris of the satellite, and timing data transmitted by the satellite, to calculate an estimated delay due to propagation, scintillation, and so forth. The timing data and estimated delay are used to determine a time correction. The time correction is applied to the timing data and used to determine estimated true time, that is then used to generate an alternate PPS signal. The estimated true time is used until the external source is available.

20 Claims, 7 Drawing Sheets

(56) References Cited

U.S. PATENT DOCUMENTS

2018/0196142 A1* 7/2018 Levy .................... G01S 19/015
2022/0132450 A1* 4/2022 Pelletier ................. G01S 11/02

OTHER PUBLICATIONS

"Ionospheric Delay", Navipedia, European Space Agency (ESA), 4 pages. Retrieved from the Internet: URL: https://gssc.esa.int/navipedia/index.php/Ionospheric_Delay.

"The Ionospheric Effect", Published on GEOG 862: GPS and GNSS for Geospatial Professionals (https://www.e-education.psu.edu/geog862), 5 pages. Retrieved from the Internet: URL: https://www.e-education.psu.edu/geog862/print/book/export/html/1715.

"Thunderbolt E GPS Disciplined Clock Overview", Trimble Inc. 2022, 4 pages. Retrieved from the Internet: URL: https://timing.trimble.com/products/disciplined-clocks/thunderbolt-e-gps-disciplined-clock/.

"Thunderbolt E GPS Disciplined Clock Datasheet", Trimble Navigation Limited 1998-2011, 2 pages. Retrieved from the Internet: URL: https://timing.trimble.com/wp-content/uploads/thunderbolt-e-gps-disciplined-clock-datasheet.pdf.

Blewitt, Geoffrey, "Basics of the GPS Technique: Observation Equations", Geoffrey Blewitt, Department of Geomatics, University of Newcastle, UK, 1997, pp. 1-46. Retrieved from the Internet: URL: http://www.nbmg.unr.edu/staff/pdfs/Blewitt%20Basics%20of%20gps.pdf.

Dana, et al., "The Role of GPS in Precise Time and Frequency Dissemination", 8 pages. Reprinted from GPSWorld Jul./Aug. 1990. Retrieved from the Internet: URL: https://ilrs.gsfc.nasa.gov/docs/timing/gpsrole.pdf.

* cited by examiner

SYSTEM TO DETERMINE PULSE PER SECOND TIMING

BACKGROUND

Communications between devices such as user terminals (UT) and satellites operate on accurate timing schedules synchronized to a common time. Loss of accurate timing may result in a failure to communicate.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
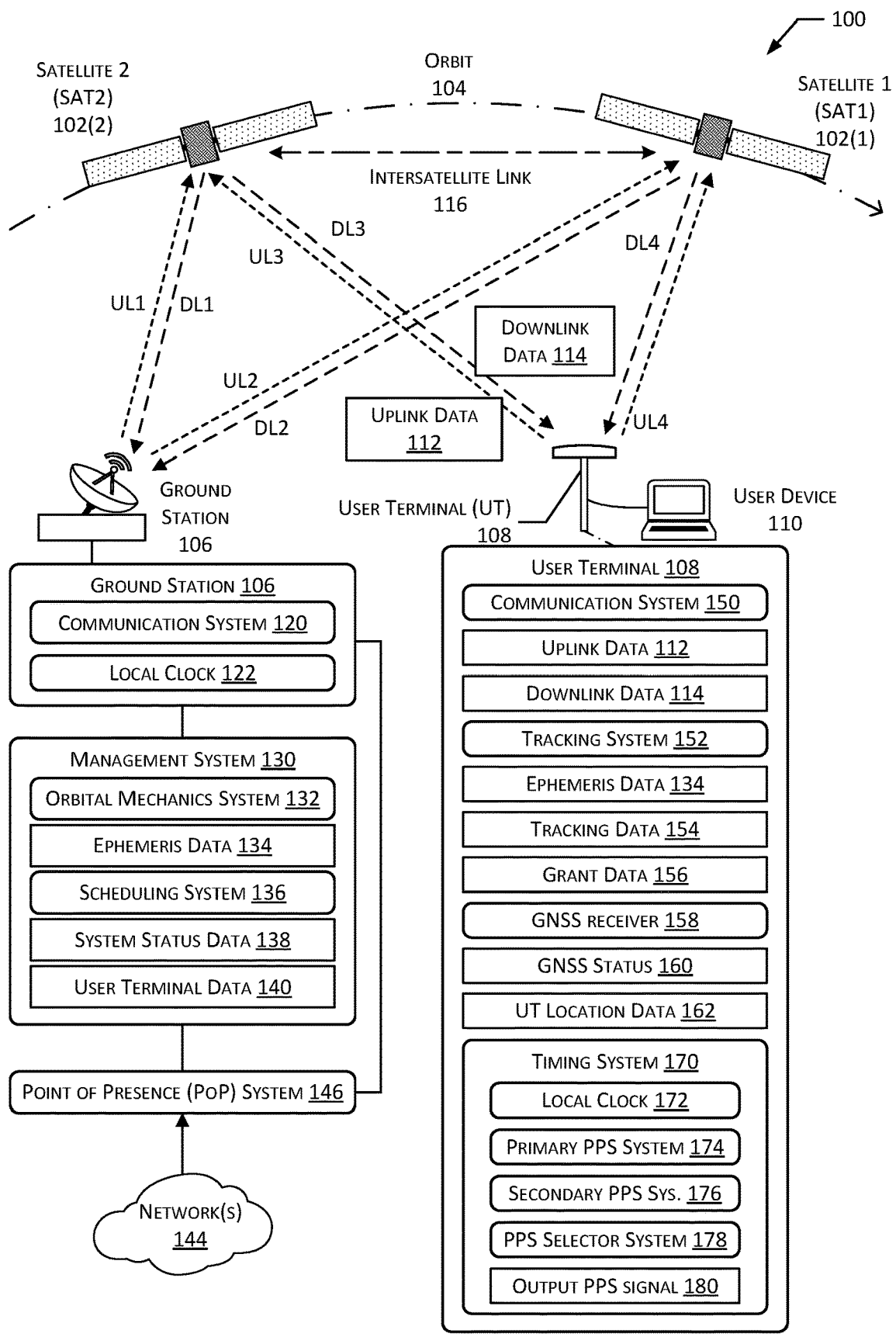
FIG. 1 illustrates a system that determines pulse per second (PPS) signals at a user terminal (UT), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communication network may utilize satellites to wirelessly transfer data between user terminals (UTs) and ground stations that in turn connect to other networks, such as the Internet. The communication network may use accurate timing to coordinate when participating devices, such as UTs, ground stations, or other satellites are to transmit, receive, and so forth. For example, a UT may be allocated a particular timeslot during which that UT is permitted to send data on an uplink to a satellite.

The more accurate the timing information used to coordinate operation is, the greater the effective utilization of bandwidth and greater the overall efficiency of the communication network. For example, more accurate timing information allows for more time in a timeslot to be allocated to data transmission and less allocated to a guard time to account for timing errors and avoid overlapping transmissions.

Each participating device in the communication network may have a clock. However, the timing information ("time") provided by a clock is subject to variability. Changes in temperature, humidity, gravitational field, movement of the entire clock, aging of the equipment, and so forth all introduce errors in the time that is output. Typically, the more accurate the clock, the more complicated, expensive, and larger it is. An inexpensive quartz wristwatch may have an accuracy of within 500 milliseconds (ms) per day (or 500,000,000 nanoseconds (ns)). In comparison, an atomic clock such as maintained by a national standards organization may have an accuracy of within 0.03 ns per day, equivalent to 1 second in 100 million years.

As mentioned earlier, the greater the timing accuracy that is available, the greater the efficiency of the communication network. For example, a timing accuracy of +250 ns may allow an uplink to a satellite to support 176 users, while a timing accuracy of +150 ns may allow the same uplink to support 256 users.

A traditional approach to providing a highly accurate time is to use a local clock, such as a quartz clock, that has been "disciplined" or receives timing information from a primary external source that is deemed to represent "true time". For the purposes of this disclosure "true time" may be considered the time standard selected for use. For example, "true time" may be International Atomic Time, Coordinated Universal Time (UTC), Barycentric Coordinate Time, and so forth. In some implementations, true time may originate from one or more stratum 0 hardware reference clocks, such as maintained by a country or standards organization. For example, true time may comprise GPS time as provided by the Global Positioning System, UTC from the National Institute of Standards and Technology (NIST), and so forth. The true time may be indicative of widely ranging timescales, such as providing information about picoseconds to years.

The primary external source has traditionally been a receiver to acquire signals from the primary external source that employs a highly accurate clock, such as an atomic clock. For example, a global navigation satellite system (GNSS) receiver may provide as output "true time" information and a pulse per second (PPS) signal. The GNSS includes satellites and ground stations that each have expensive and complex atomic clocks. Continuing the example, Global Positioning System (GPS) satellites have two cesium atomic clocks onboard and are subject to various adjustments to that true time under ongoing management from a ground station.

The true time from the GNSS or other primary external source may be used to set the local clock values while the PPS signal is used to specify when the next second begins. The PPS signal may be distributed to other components in the device such as transmitters and receivers to set their timing. Such disciplined clocks are able to achieve timing accuracy of 15 ns. By using a relatively inexpensive local clock that is disciplined by output from a relatively inexpensive GNSS receiver, it is possible to maintain highly accurate timing on a device such as a UT and the components therein. However, this discipline fails if the primary external source of timing information is unavailable.

Traditionally, in the event the primary external source is unavailable, the external discipline imposed on the local clock is lost. As a result, the local clock begins to drift, with the timing information that is output moving away from reporting true time. Traditionally various measures have been employed to try and maintain timing information with sufficient accuracy for as long as possible. However, these approaches increase the cost and complexity of the device and only forestall the loss of timing for a short span. For example, a more precisely manufactured, and thus expensive, quartz crystal may be used. In another example, the quartz crystal may be placed inside a small oven that heats up the crystal to a particular temperature. Even with these attempts to mitigate the loss of the primary external source, these local clocks will drift outside of the accuracy needed to operate the communication network.

Described in this disclosure are systems and techniques that allow a device, such as a UT, to continue to maintain highly accurate timing information in the event of a loss of timing information from a primary external source, such as a GNSS. This allows the device to continue operation in situations such as an "urban canyon" where GNSS signals may be blocked by buildings, instances where electromagnetic interference prevents reception of GNSS signals, in the event of GNSS service outages, and so forth. These systems and techniques may be implemented using inexpensive and compact hardware, allowing for rapid and effective deployment. These systems also facilitate the distribution of highly accurate timing information to devices at distant locations, that allow the device to determine a close proxy to true time.

Signals between the UT and the satellite are limited to travelling at the speed of light. Distance delays occur because the farther away a satellite is from the UT, the longer it takes for a signal to travel to the satellite, and vice versa. Atmospheric delays may result from atmospheric effects such as density changes, ionospheric effects, atmospheric scintillation, and so forth. Relativistic effects are also experienced due to relative location and motion of the UT and the satellite. Once a signal reaches a receiver, other delays due to signal processing are also present.

Using a constellation of many non-geosynchronous orbit (NGO) satellites offers significant benefits compared to a geosynchronous satellite. Latency is dramatically reduced due to the shorter distances between UTs and satellites, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

To coordinate the operation of the communication network that includes the constellation of satellites and UTs, timing information based on true time is used. For example, operation of the transmitters and the receivers onboard the satellites as well as transmitters and receivers at the UTs may be coordinated based on the true time. To reduce the cost, mass, power consumption, and so forth of a communication satellite in the constellation, the communication satellite may include a GNSS receiver. The GNSS receiver provides true time and is used to determine a primary PPS signal to the communication system onboard the satellite. Similarly, the UT may include a GNSS receiver that provides a primary PPS signal to the communication system of the UT. By using their respective primary PPS signals, so long as the timing information is available from the GNSS, the timing of the two devices is highly synchronized.

A loss of the GNSS, or other primary external source of timing discipline by a device, results in the device recovering the true time using information from other devices participating in the communication system. In a first implementation, in the event of a GNSS or other primary external source failure, the UT uses information received from the satellite(s) to determine local corrected time and provide a secondary PPS. The satellite may transmit downlink data that includes information such as a transmit time of the information, ephemeris data about the satellite, satellite location data, atmospheric correction data, and so forth. The downlink data may be a beacon broadcast, header information included in downlink data to other UTs, and so forth. The downlink data may not be specifically directed to the UT that has experienced the loss of the primary external source. The UT has previously stored location data indicating where the UT is located.

By using the information received in the downlink data and the known information about the UT location, the UT is able to determine the delays that are associated with transmissions from the satellite. For example, given the known location of the satellite and the UT location, a distance between the two is calculated. The distance divided by the speed of light provides the distance delay. Other calculations may be made to account for atmospheric delays, relativistic effects, and so forth. This information is used to determine time correction data. The time correction data is then applied to the transmit time and used to determine local corrected time. These operations may be iterated and averaged to further refine the time correction data. The time correction data may then be used to discipline the local clock and determine a secondary PPS. As a result, the UT is able to recover an accurate proxy of the true time and is able to continue operating.

In a second implementation the UT may receive additional information from the satellite. The UT may send on the uplink a "loss of time" message to the satellite. This message may include a transmit time indicative of when the message was sent with respect to the local clock of the UT, and location data of the UT. The satellite may determine a reception time indicating when the satellite received the message, with respect to the satellite's clock that is disciplined to the true time. The reception time, or information based thereon, may then be sent on the downlink to the UT. The UT may then use this information as part of the determination of the time correction data.

In a third implementation, the satellite may use the transmit time and associated reception time of data received from the UT on the uplink to determine time correction data. The time correction data may then be transmitted on the downlink to the UT. The UT may then use this time correction data to determine the local corrected time.

The constellation may also be used to gather information that allows for improved determination of atmospheric delay. For example, given many satellites with constantly changing positions relative to Earth and a large number of UTs, it becomes feasible to provide a very large set of data with respect to atmospheric effects on uplink and downlink signals under various conditions. This set of data may be processed to determine atmospheric correction data that accounts for delays due to atmospheric effects. The atmospheric correction data may then be used in the implementations described above to further refine the determination of the delay between the devices. As a result, the overall accuracy of the time correction data is improved. This improves the accuracy in the local corrected time. This improvement in accuracy may allow the use of smaller time intervals for coordinating operation of the system, further increasing the overall efficiency.

The system and techniques described in this disclosure add little or no overhead to operation of the communication network and thus are extremely efficient. For example, information such as the satellite location data and ephemeris data may be included in the downlink data for other uses, such as to allow the UTs to track satellites and steer directional antenna arrays.

By using the system and techniques described in this disclosure, overall efficiency of a communication system using a satellite constellation is substantially improved. Improved timing accuracy is provided without substantive increases in the cost or complexity of hardware. This improves system reliability and reduces overall cost.

By providing highly accurate timing, it is also possible to provide a highly accurate frequency output. This allows receivers and transmitters to more precisely control their receive and transmit frequencies, respectively.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UT) 108, a user device 110, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1, an uplink ("UL") is a communication link which allows uplink data 112 to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows downlink data 114 to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 116 provides for communication between satellites 102 in the constellation. The uplink data 112 and the downlink data 114 may each comprise header data and payload data.

One or more ground stations 106 comprise facilities that are in communication with one or more satellites 102. The ground stations 106 may pass data between the satellites 102, a management system 130, networks such as the Internet, and so forth. The ground stations 106 may be emplaced on land, on vehicles, at sea, and so forth. Each ground station 106 may comprise a communication system 120. Each ground station 106 may use the communication system 120 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data or other data between the one or more communication networks and the satellites 102. Such data may be processed by the ground station 106 and communicated via the communication system 120. The communication system 120 of a ground station 106 may include components similar to those of the communication system of a satellite 102 and may perform similar communication functionalities. For example, the communication system 120 may include one or more modems, digital signal processors, power amplifiers, antennas (including at least one antenna that implements multiple antenna elements, such as a phased array antenna), processors, memories, storage devices, communications peripherals, interface buses, and so forth.

The ground station 106 may include a local clock 122. The local clock 122 may be disciplined to true time using a primary external source. For example, the primary external source may comprise a global navigation satellite system (GNSS) receiver such as Global Positioning System, Galileo, Glonass, BeiDou, and so forth. For the purposes of this disclosure "true time" may be considered the time standard selected for use. For example, "true time" may be International Atomic Time, Coordinated Universal Time, Barycentric Coordinate Time, and so forth. The true time may be indicative of widely ranging timescales, such as providing information about picoseconds to years.

In some implementations the ground station 106 may include a local high precision clock. For example, the local clock 122 of the ground station 106 may comprise one or more of an atomic clock, quantum clock, optical lattice clock, and so forth. Output from the local clock 122 may be used to operate the communication system 120. For example, similar to that described below with regard to the timing system 170 of the UT 108, a primary pulse per second (PPS) signal may be used to provide timing information to components such as transmitters or receivers of the communication system 120.

The ground stations 106 are in communication with a management system 130. The management system 130 is also in communication, via the ground stations 106, with the satellites 102 and the UTs 108. The management system 130 coordinates operation of the satellites 102, ground stations 106, UTs 108, and other resources of the system 100. The management system 130 may comprise one or more of an orbital mechanics system 132 or a scheduling system 136. The management system 130 may comprise one or more servers or other computing devices.

The orbital mechanics system 132 determines ephemeris data 134 that is indicative of a state of a particular satellite 102 at a specified time. In one implementation, the orbital mechanics system 132 may use orbital elements that represent characteristics of the orbit 104 of the satellites 102 in the constellation to determine the ephemeris data 134 that predicts location, velocity, and so forth of particular satellites 102 at particular times or time intervals. For example, the orbital mechanics system 132 may use data obtained from actual observations from tracking stations, data from the satellites 102, scheduled maneuvers, and so forth to determine the orbital elements. The orbital mechanics system 132 may also consider other data, such as space weather, collision mitigation, orbital elements of known debris, and so forth.

The scheduling system 136 schedules resources to provide communication to the UTs 108. For example, the scheduling system 136 may determine handover data that indicates a time when communication is to be transferred from the first satellite 102(1) to the second satellite 102(2). Continuing the example, the scheduling system 136 may also specify communication parameters such as frequency, timeslot, and so forth. During operation, the scheduling system 136 may use information such as the ephemeris data 134, system status data 138, user terminal data 140, and so forth.

The system status data 138 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 138 may be indicative of past status, predictions of future status, and so forth. For example, the system status data 138 may include information such as projected data traffic for a specified interval of time based on previous transfers of user data. In another example, the system status data 138 may be indicative of future status, such as a satellite 102 being unavailable to provide communication service due to scheduled maneuvering, scheduled maintenance, scheduled decommissioning, and so forth.

The user terminal data 140 may comprise information such as a location of a particular UT 108. The user terminal data 140 may also include other information such as a priority assigned to user data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 150 to establish communication with one or more satellites 102. The communication system 150 of the UT 108 may include components similar to those of the communication system 212 of a satellite 102 and may perform similar communication functionalities. For example, the communication system 150 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data between the constellation of satellites 102 and the user device 110. The user data includes data originated by the user device 110 or data addressed to the user device 110.

The UT 108 may be fixed or in motion. For example, the UT 108 may be used at a residence, business, or on a vehicle such as a car, boat, aerostat, drone, airplane, and so forth. The UT 108 includes a tracking system 152. The tracking system 152 uses ephemeris data 134 to determine tracking data 154. The ephemeris data 134 provides information indicative of orbital elements of the orbit 104 of one or more satellites 102. For example, the ephemeris data 134 may comprise orbital elements such as "two-line element" data for the satellites 102 in the constellation that are broadcast or otherwise sent to the UTs 108 using the communication system 150.

The tracking system 152 may use UT location data 162(see below) of the UT 108 and the ephemeris data 134 to determine the tracking data 154 for the satellite 102. For example, based on the current location of the UT 108 and the predicted position and movement of the satellites 102, the tracking system 152 is able to calculate the tracking data 154. The tracking data 154 may include information indicative of azimuth, elevation, distance to the second satellite 102(2), time of flight correction, or other information associated with a specified time. The determination of the tracking data 154 may be ongoing. For example, the first UT 108 may determine tracking data 154 every 100 ms, every second, every five seconds, or at other intervals.

In some implementations the satellite 102 may provide grant data 156 to the UT 108. The grant data 156 may specify information about how and when the UT 108 is permitted to utilize the uplink to the satellite 102. For example, the grant data 156 may specify a frequency, modulation, timeslot, and so forth that are allocated for the UT 108 to use to send uplink data 112 to the satellite 102.

The UT 108 may include a global navigation satellite system (GNSS) receiver 158. For example, the GNSS receiver 158 may receive and process signals from one or more GNSSs, such as Global Positioning System (GPS), Galileo, Glonass, BeiDou, and so forth. The GNSS receiver 158 may provide various outputs, such a GNSS status 160, UT location data 162, and so forth. The GNSS status 160 may comprise information about the state of the GNSS itself or portions thereof, the GNSS receiver 158 itself, and so forth. The GNSS status 160 may be indicative of the GNSS receiver 158 determining it is in an error state. For example, the GNSS status 160 may provide output indicative of "no satellites in view", "receiver failure", "interference detected", and so forth. In another example, the GNSS status 160, or absence thereof, may indicate that the GNSS receiver 158 is inoperable. The GNSS status 160 may comprise, or be based on, an error message received by the GNSS receiver 158. For example, an error message may be transmitted by the GNSS constellation indicating degraded service, a service outage, and so forth. The GNSS status 160 may be indicative of other conditions, such as an inability to provide timing information with a specified precision. For example, the GNSS stat 160 may indicate an error if the timing information is provided with a timing precision that is worse than (greater than) 50 ns.

The UT location data 162 is indicative of a location of the UT 108. For example, the UT location data 162 may specify the latitude, longitude, and altitude of the UT 108 or a portion thereof such as an antenna. In some implementations, the UT location data 162 may include other information such as a heading or orientation of the UT 108 or a portion thereof.

The UT 108 includes a timing system 170. The timing system 170 includes a local clock 172. The local clock 172 may comprise a local oscillator and associated circuitry that measures time intervals. For example, the local clock 172 may comprise a clock comprising an oscillator incorporating a quartz crystal. The local clock 172 may be disciplined using output from a primary external source, such as the GNSS receiver 158. The disciplining allows for ongoing correction of the local clock 172 to "true time" that is provided by the GNSS receiver 158.

A PPS signal indicates the start of the next second and may be used to synchronize or set other clocks or oscillators. These clocks or oscillators may be found in various components of the UT 108, such as transmitters and receivers in the communication system 150.

A primary PPS system 174 provides a primary PPS signal. The primary PPS signal may be based on output from a primary external source. For example, the primary PPS system 174 may comprise the GNSS receiver 158 that provides as output the primary PPS signal. In some implementations, the primary PPS system 174 may use a primary internal source, such as a local atomic clock or other high precision clock.

A secondary PPS system 176 provides a secondary PPS signal. The secondary PPS system 176 is configured to determine true time based on downlink data 114 from one or more satellites 102 in the constellation. The downlink data 114 is discussed with regard to FIG. 4. Operation of the secondary PPS system 176 is discussed in the following figures, including FIG. 5.

A PPS selector system 178 determines whether to distribute the first PPS signal or the second PPS signal as the output PPS signal 180 to the components of the UT 108. In one implementation, the PPS selector system 178 may use the GNSS status 160 to determine if the GNSS receiver 158 is operating properly and producing a reliable output. In another implementation, the PPS selector system 178 may assess the primary PPS signal and the secondary PPS signal and determine which is deemed to be more accurate. In the event the primary PPS signal is unavailable or deemed to be inaccurate, the PPS selector system 178 distributes the secondary PPS signal as the output PPS signal 180. By distributing the secondary PPS signal as the output PPS signal 180, the UT 108 is able to maintain ongoing accurate true time information and compensate for drift and other factors affecting the local clock 172.

The output PPS signal 180 is distributed to the components of the UT 108. For example, the output PPS signal 180 may be used to discipline local oscillators of one or more of a receiver or transmitter in the communication system 150, phased array antenna circuitry, and so forth.

A device, such as a server, uses one or more networks 144 to send data that is addressed to a UT 108 or a user device 110 that is connected to the UT 108. The system 100 may include one or more point of presence (POP) systems 146.

Each POP system 146 may comprise one or more servers or other computing devices at a facility, such as on Earth. Separate POP systems 146 may be located at different locations in different facilities. In one implementation, a PoP system 146 may be associated with providing service to a plurality of UTs 108 that are located in a particular geographic region.

The POP system 146 is in communication with one or more ground stations 106(1), 106(2), . . . , 106(G) and the management system 130. In some implementations one or more functions may be combined. For example, the POP system 146 may perform one or more functions of the management system 130. In another example, the POP system 146 may include an integrated ground station 106. The POP system 146 accepts data addressed to the UT 108 or associated device and proceeds to attempt delivery using the communication network 144. This data may ultimately be sent as downlink data 114 to the UT 108. Similarly, the POP system 146 accepts data sent as uplink data 112 from the UT 108 to the satellite 102, and directs this data to the network 144.

Various configurations of the systems described in this disclosure may be used. In one implementation, the ground station 106, the management system 130, and the POP system 146 may be present at different physical locations. For example, ground stations 106 may be present at different locations on the Earth to provide desired communication coverage with the satellites 102. The POP system 146 may comprise one or more servers and may be located in a first datacenter. The management system 130 may comprise one or more servers at a second datacenter.

The satellite 102, the ground station 106, the user terminal 108, the user device 110, the management system 130, the POP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
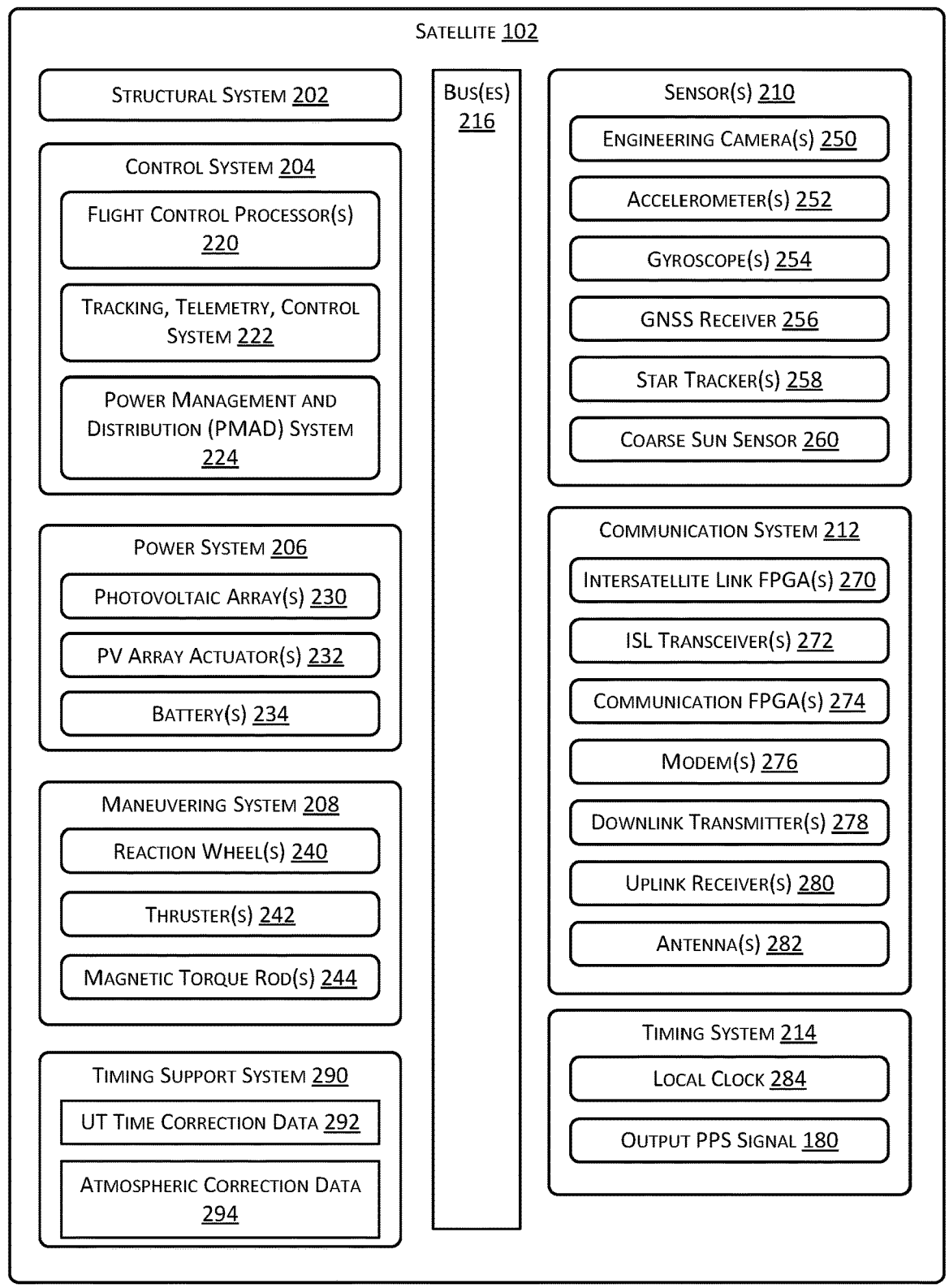
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. The satellite 102 may include a timing system 214. The timing system 214 may comprise a local clock 284 and provides an output PPS signal 180. In some implementations the timing system 214 may be similar to the timing system 170 as described herein. For example, a primary PPS system 174 may use output from a GNSS receiver 158 to provide a primary PPS signal, and a secondary PPS system 176 may provide a secondary PPS signal for use if the primary PPS signal is unavailable. The output PPS signal 180 provides timing reference to the systems onboard the satellite 102.

One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for photovoltaic panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s)

230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) receiver 256, such as a Global Positioning System (GPS) receiver, to provide information about the position of the satellite 102 relative to Earth. In some implementations the GNSS receiver 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102 due to the gain.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 116. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

A timing support system 290 may be configured to determine UT time correction data 292. For example, the UT time correction data 292 may be determined based on the delays to the uplink data 112, a transmit time of the uplink data 112 from the UT 108 with respect to the local clock 172 of the UT 108, and a reception time of the uplink data 112 at the satellite 102 with respect to the local clock 284. For example, the UT time correction data 292 may indicate the difference between the local time of the UT 108 local clock 172 as adjusted for the delays associated with the travel of the signal and the satellite 102 local clock 284. The UT time correction data 292 may include, or be associated with, other information that indicates particular uplink data 112. For example, the UT time correction data 292 may indicate a frame number of the uplink data 112. The UT time correction data 292 is discussed in more detail with regard to the FIGS. 5 and 6.

In some implementations, the satellite 102 may determine at least a portion of, or distribute, atmospheric correction data 294. The atmospheric correction data 294 may be indicative of delays or other corrections to timing that result from effects of the atmosphere between participating devices such as a transmitter of the UT 108 and a receiver of the satellite 102, or vice versa. The atmospheric correction data 294 may be determined based on one or more of uplink data 112 or downlink data 114. The atmospheric correction data 294 is discussed in more detail with respect to the following figures.

Figure 3:
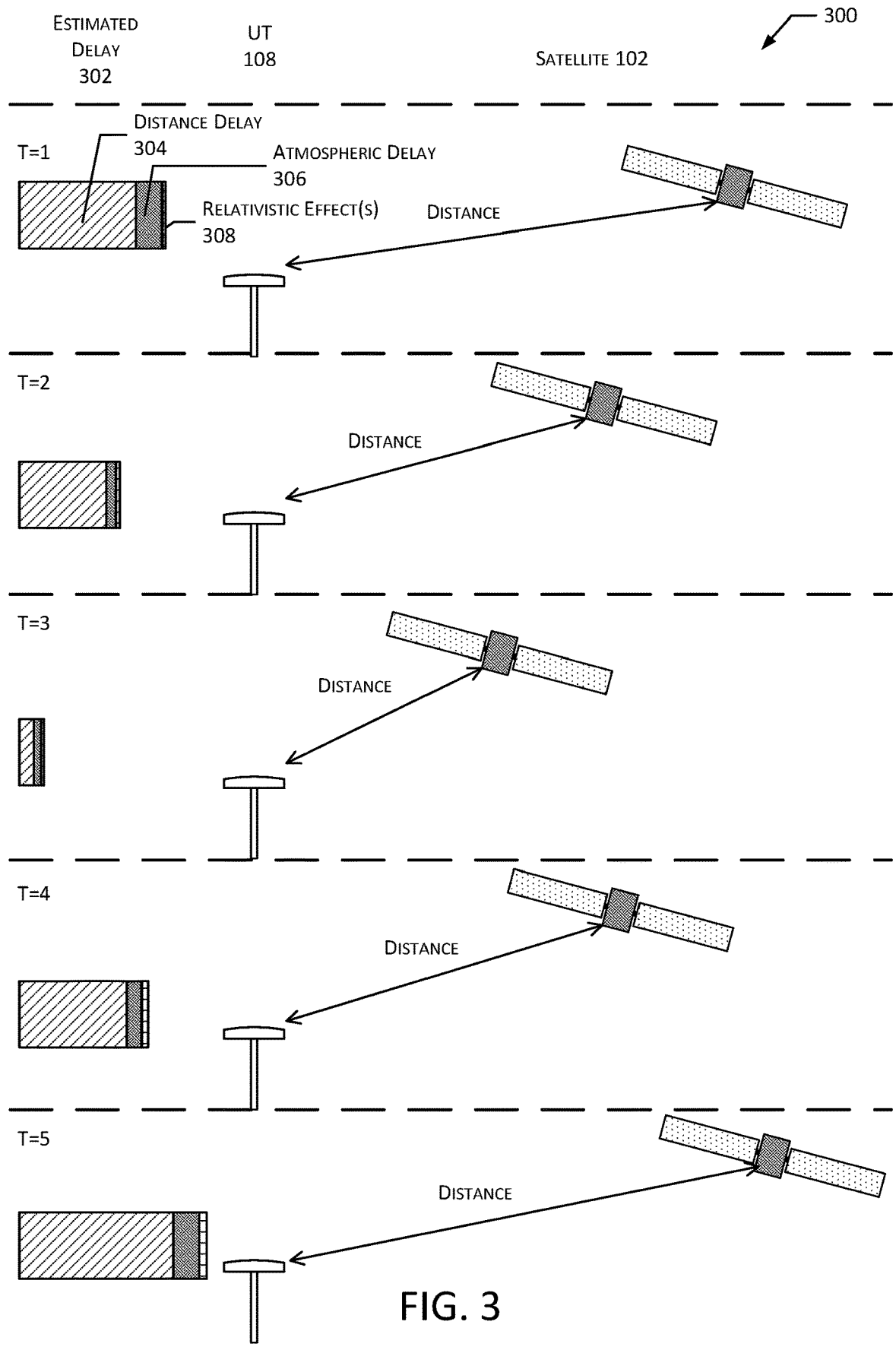
FIG. 3 illustrates changes in delays due to movement of a satellite in a non-geosynchronous orbit (NGO) relative to a UT.

FIG. 3 illustrates at 300 changes in estimated delay 302 in propagation of a signal between a satellite 102 and a UT 108. The estimated delay 302 may comprise delays due to several different factors including distance, intervening atmosphere, and effects due to special relativity.

A position of the satellite 102 in orbit 104 may change over time, changing a distance between the ground station 106 and the satellite 102. Because the electromagnetic signal has a maximum speed of "c", as the distance changes so too does the amount of time it takes for a signal to travel between the ground station 106 and the satellite 102. In one implementation, a distance delay 304 that results from this distance may be determined by dividing the distance by c.

Atmospheric delay 306 may result from the effects on a signal of an intervening atmosphere. For example, atmospheric delay includes delays that result from diffraction, reflection, changes in the propagation velocity, and so forth. The atmosphere that contributes to these effects includes the troposphere close to the Earth's surface up through the ionosphere and the thermosphere and higher at the altitude of the satellites 102. For example, changes in the ionosphere may cause the path travelled by a signal to change, producing a change in distance between the UT 108 and the satellite 102.

Relativistic effects 308 may also be considered. Special relativity is a branch of physics that involves objects that are moving relative to one another, are within a gravitational field, and so forth. In situations where two clocks are moving at some speed relative to one another, those clocks will appear to tick at different rates. For example, the clock in an orbiting satellite will appear to be ticking slower than a clock on the ground. Gravity also affects the operation of clocks. For example, the closer a clock is to a body having a gravitational field, the slower that clock will tick. Continuing the example, an atomic clock at sea level will appear to tick more slowly than an atomic clock in orbit. The relativistic effects 308 may take into consideration the altitude of the two devices, their relative velocities, and so forth.

The distance between the ground station 106 and the satellite 102 may be calculated given the known location of the ground station 106 and the ephemeris data 134. If the downlink data 114 includes location data about the satellite 102 obtained from the GNSS receiver 158, the distance may be determined to within a few meters. For example, the distance may then be calculated based on the known locations of the UT 108 and the satellite 102. The distance "D" may also be known as the "slant range".

In this illustration, a bar graph depicting a relative magnitude of an estimated delay 302 and the constituents is shown for times t=1, 2, 3, 4, and 5. Also shown is the UT 108 and the satellite 102 that is providing communication services. As time progresses, distance between the satellite 102 and the UT 108 changes due to the relative motion of the satellite 102 with respect to the Earth where the UT 108 is placed. At time t=1 where the distance is relatively large, the estimated delay 302 is relatively large. As the distance decreases to time t=3, so too does the estimated delay 302. As a result of this changing estimated delay 302, the overall delay associated with sending data to the satellite 102 will change from one time to another. Likewise, the overall delay associated with sending data from the satellite 102 to the UT 108 will also change from one time to another.

Figure 4:
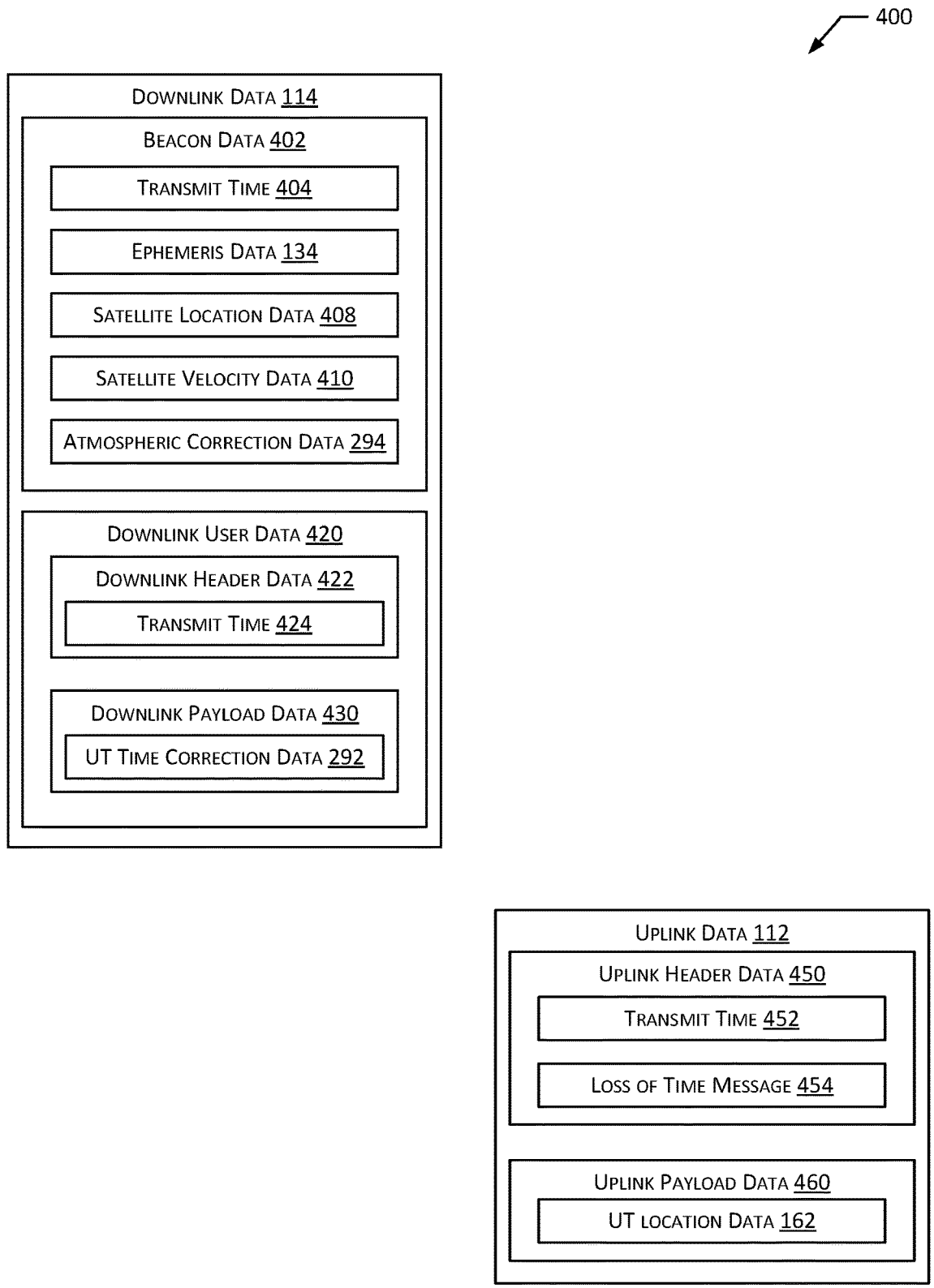
FIG. 4 illustrates data associated with operation of the system, according to some implementations.

FIG. 4 illustrates at 400 data associated with operation of the system, according to some implementations.

The downlink data 114 may comprise one or more of beacon data 402 or downlink user data 420. In some implementations beacon data 402 may be sent separately from the downlink user data 420. For example, the beacon data 402 may be transmitted on a first frequency at a first time, while the downlink user data 420 is transmitted on a second frequency at a second time.

The beacon data 402 may comprise one or more of transmit time 404, ephemeris data 134 or a portion thereof, satellite location data 408, satellite velocity data 410, atmospheric correction data 294, or other information. The transmit time 404 is indicative of a time, with respect to the local clock 284 of the satellite 102, when the beacon data 402 was transmitted.

The ephemeris data 134 may comprise information indicative the orbital elements associated with the satellite 102 that is sending the ephemeris data 134. In other implementations, the ephemeris data 134 for a plurality of satellites 102 may be included in the beacon data 402.

The satellite location data 408 is indicative of a location of the satellite 102 that is associated with the transmit time 404. For example, the satellite location data 408 may be obtained from the GNSS receiver 158 and is indicative of the coordinates in space including altitude of the satellite 102.

The satellite velocity data 410 may comprise data indicative of a velocity of the satellite 102 that is associated with the transmit time 404. The velocity may be specified with respect to a specified reference frame. For example, the GNSS receiver 158 may provide the satellite velocity data 410.

The atmospheric correction data 294 may be based on, or be indicative of, the atmospheric delay 306. For example, the timing support system 290 may determine the atmospheric correction data 294 based on data obtained from communication with a plurality of UTs 108. In some implementations, the atmospheric correction data 294 may be provided by the ground station 106, management system 130, or other system.

The downlink user data 420 may comprise downlink header data 422 and downlink payload data 430. The downlink header data 422 comprises transmit time 424. The transmit time 424 indicates a time that the downlink user data 420 was transmitted, relative to the local clock 284 of the satellite 102 as disciplined to true time from a primary external source. The downlink header data 422 may comprise other information such as source address, destination address, priority, and so forth.

The downlink payload data 430 may comprise information that is addressed to the UT 108 or user device 110 connected thereto. For example, the downlink payload data 430 may comprise image data, web page data, and so forth. The downlink payload data 430 may comprise UT time correction data 292. The UT time correction data 292 may be indicative of a differential between the true time at the satellite 102 and a transmit time 452 of uplink data 112, taking into consideration the estimated delay 302 at that time. In some implementations, the UT time correction data 292 may be determined based on a difference between reception time indicative of the true time when the uplink data 112 was received and an actual or inferred transmit time of the uplink data 112. The actual transmit time may comprise transmit time information that is included in the uplink data 112. The inferred transmit time may be determined based on the reception time and an assumption that the UT 108 properly determined one or more estimated delays 302 to the satellite 102 and sent the uplink data 112 so that the uplink data 112 would arrive at the satellite 108 at a specified time, such as at the beginning of a timeslot specified by grant data 156. In some implementations, the UT time correction data 292 may be transmitted responsive to receiving uplink data 112.

The uplink data 112 may comprise uplink header data 450 and uplink payload data 460. The uplink header data 450 comprises the transmit time 452. The transmit time 452 indicates a time that the uplink data 112 was transmitted, relative to the local clock 172 of the UT 108. The uplink header data 450 may also include a loss of time message 454 or other data indicative of a loss of time. For example, the loss of time message 454 may comprise a single bit value that indicates whether the UT 108 is using the primary PPS signal or the secondary PPS signal. The uplink header data 450 may comprise other information such as source address, destination address, priority, and so forth.

The uplink payload data 460 may comprise the UT location data 162. The uplink payload data 460 may comprise information that is addressed to another device, such as the satellite 102, the management system 130, a server connected to the network 144, and so forth. For example, the uplink payload data 460 may comprise an email message, image data, audio data, and so forth.

The downlink data 114 or portions thereof may be encrypted. Different cryptographic keys may be used to encrypt different portions. For example, the beacon data 402 may be encrypted with a first cryptographic key while the downlink payload data 430 is encrypted with a second cryptographic key, the uplink payload data 460 is encrypted with a third cryptographic key, and so forth.

Figure 5:
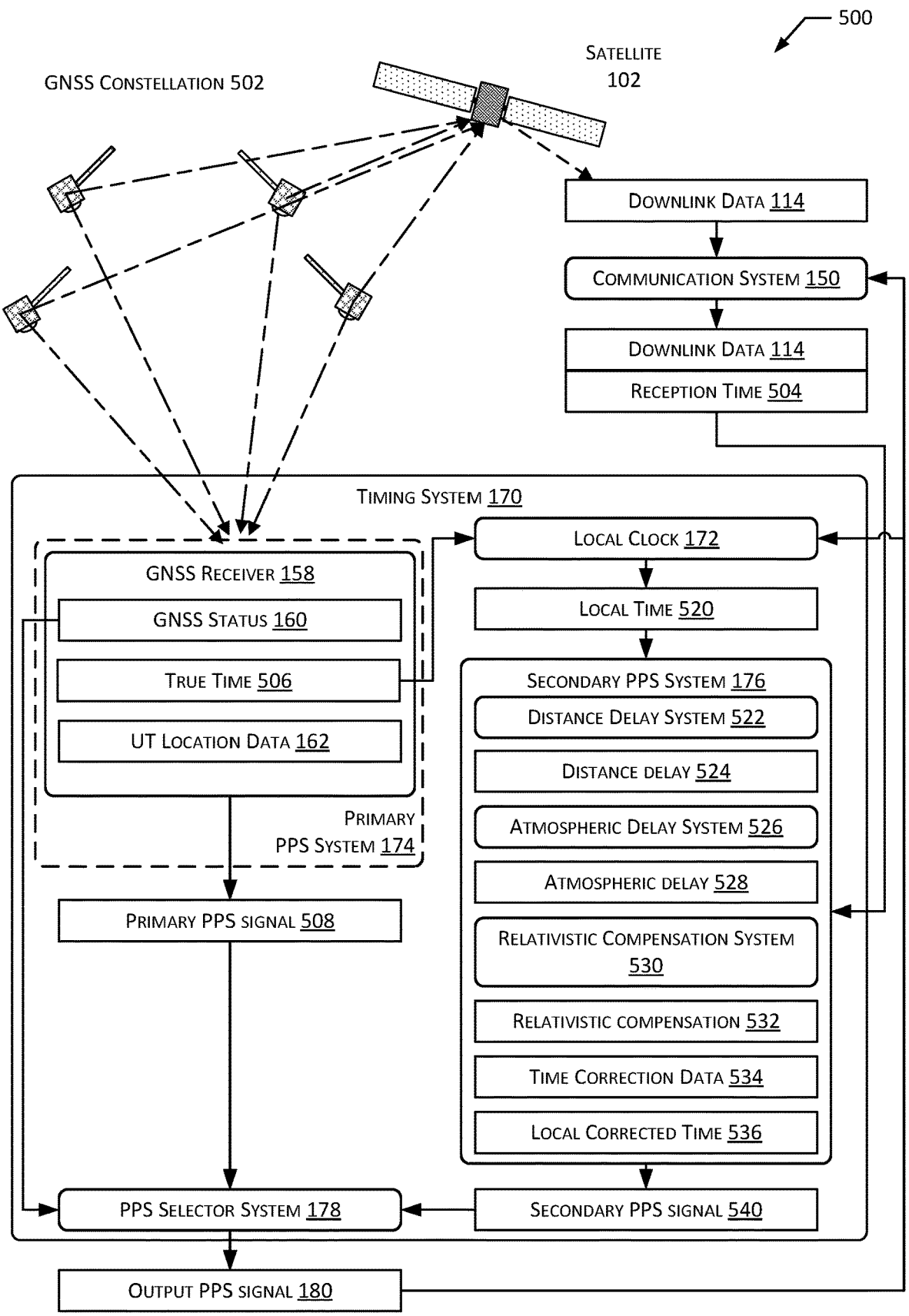
FIG. 5 illustrates a timing system of the UT that provides PPS signals, according to some implementations.

FIG. 5 illustrates at 500 the timing system 170 of the UT 108 that determines PPS signals, according to some implementations.

The primary external source in this illustration is a GNSS constellation 502. For example, the GNSS constellation 502 may comprise Global Positioning System, Indian Regional Navigation Satellite System (IRNSS) also known as "NavIC", Quasi-Zenith Satellite System (QZSS), Galileo, Glonass, BeiDou, and so forth.

In other implementations the primary external source may comprise a terrestrial radio transmitter. For example, the primary external source may comprise a national time signal such as provided by radio station WWVB that transmits NIST UTC time at 60 kHz. In another example, the primary external source may comprise an enhanced long range navigation (eLORAN) system.

The timing system 170 comprises the primary PPS system 174. In this illustration, the primary PPS system 174 comprises a GNSS receiver 158 or other components associated with acquiring information from the primary external source. As described above, the GNSS receiver 158 may provide as output GNSS status 160 indicative of the status of operation of the GNSS constellation 502, the GNSS receiver 158 itself, and so forth. The GNSS receiver 158 may provide output timing information that includes data indicative of true time 506. For example, the true time 506 provided by the GPS system may be GPS time expressed as serialized data. The GNSS receiver 158 may also determine the UT location data 162. The GNSS receiver 158 may include or be in communication with circuitry that provides a primary PPS signal 508. While the true time 506 indicates the year, day, hour, minute, and so forth, the primary PPS signal 508 is indicative of a start time of a second.

The primary PPS signal 508 is provided to the PPS selector system 178. The PPS selector system 178 may also receive the GNSS status 160 or input based thereon. During normal operation, such as when the GNSS status 160 indicates normal or acceptable operation, the PPS selector system 178 selects the primary PPS signal 508 for use. The primary PPS signal 508 is then distributed to the components of the UT 108 as the output PPS signal 180. For example, the output PPS signal 180 may be used with the true time 506 to discipline the local clock 172.

The output of the local clock 172 is shown here as local time 520. The local time 520 may be provided as input to the secondary PPS system 176. The secondary PPS system 176 may include one or more of a distance delay system 522, atmospheric delay system 526, or a relativistic compensation system 530.

The secondary PPS system 176 receives information from the communication system 150. The communication system 150 may provide at least a portion of the downlink data 114 to the secondary PPS system 176. For example, the communication system 150 may send the beacon data 402, transmit time 424, UT time correction data 292, and so forth. The communication system 150 may also determine a reception time 504 that is indicative of a time, with respect to the local clock 172, that the downlink data 114 or a portion thereof was received.

The downlink data 114 used by the UT 108 and the timing system 170 therein is not necessarily addressed to the UT 108. For example, the system is operable if the beacon data 402 and transmit time 424 are unencrypted or are decryptable by a receiving UT 108. The UT 108 may thus acquire and recover time information based on the downlink data 114 that is broadcast or addressed to other UTs 108.

The distance delay system 522 determines a distance delay 524 indicative of a time that the signal is expected to have taken to travel the distance between the location of the satellite 102 at the transmit time 404 and the location of the UT 108 at the reception time 504. The distance delay 524 may be calculated based on the distance in space specified by the satellite location data 408 and the UT location data 162, divided by an expected speed of the signal through the intervening medium.

The atmospheric delay system 526 may determine the atmospheric delay 528 based on one or more of previous measurements, atmospheric correction data 294 received from the satellite 102, and so forth. In one implementation, the atmospheric delay system 526 may retrieve the atmospheric delay 528 data based on the satellite location data 408 and the UT location data 162, with different values to accommodate varying relative azimuth and elevation of the satellite 102 with respect to the UT 108.

The relativistic compensation system 530 determines relativistic compensation 532 values that are representative of the relativistic effects 308 involved. For example, the relativistic compensation system 530 may use one or more of the satellite location data 408 or the satellite velocity data 410 to determine a gravitational frequency shift associated with the satellite 102, time dilation due to motion, and so forth.

Based on one or more of the distance delay 524, the atmospheric delay 528, or the relativistic compensation 532, the secondary PPS system 176 determines time correction data 534. The time correction data 534 may be indicative of an offset or variance that is to be applied to the reception time 504 to recover true time at the satellite 102 as of the transmit time 404.

In other implementations, the time correction data 534 may use other information indicative of delays associated with operation of the components of one or more of the satellite 102 or the UT 108. For example, the time correction data 534 be based on a communication system 150 processing delay due to operation of the circuitry in the communication system 150 to receive and determine the reception time 504.

The determination of the time correction data 534 is improved by iterating the process. For example, a plurality of samples of transmitted frames may be acquired and used to provide a plurality of downlink data 114. The time correction data 534 may be determined based on an average of many samples.

The time correction data 534 may be applied to the local time 520 to determine local corrected time 536. The local corrected time 536 is a close proxy to the true time provided at the disciplined local clock 284 of the satellite 102. Based on the local corrected time 536, the secondary PPS system 176 provides the secondary PPS signal 540 to the PPS selector system 178. In the event the PPS selector system 178 determines that the primary PPS signal 508 is abnormal or unavailable, the secondary PPS signal 540 is selected for use and is distributed to the components of the UT 108 as the output PPS signal 180.

In one implementation, the UT 108 is fixed with respect to Earth and remains at the same location. Over time during normal operation, several samples of UT location data 162 may be acquired by the GNSS receiver 158 and processed to determine a highly accurate position, such as within centimeters. This highly accurate UT location data 162 may then be stored and retrieved for use by the secondary PPS system 176. In another example, the UT location data 162 may be manually entered, or otherwise provided as stored data.

In another implementation the UT 108 is mobile with respect to Earth. In this implementation, the UT location data 162 may be updated based on information from other systems or sensors. For example, given a known starting location, an inertial navigation system may integrate accelerations and rotations with respect to six degrees of freedom to determine the UT location data 162 at a later time. In another example, another system such as an optical navigation system using one or more cameras observing fixed objects, odometry and map, and so forth may be used to determine the UT location data 162.

The timing system 170 may be implemented by other devices. In one implementation, the timing system 214 of the satellite 102 may implement techniques similar to those described with respect to the timing system 170 of the UT 108. In this implementation, the satellite 102 may utilize uplink data and signals sent from the ground station 106 to the satellite 102 to determine the secondary PPS signal 540. For example, the local clock 122 of the ground station 106 may comprise one or more of an atomic clock, quantum clock, and so forth that provides highly accurate timing information. Based on the actual or inferred transmit time 452 of uplink data 112, ground station location data, the satellite location data, and so forth, the timing system 214 may determine the secondary PPS signal 540 that is then distributed to the components of the satellite 102.

The output PPS signal 180 and the local corrected time 536 provide highly accurate time information, even if the primary PPS signal 508 is unavailable. The output PPS signal 180 may be used to provide timing to components in the UT 108, such as one or more oscillators in the communication system 150, such as used in a receiver, transmitter, and so forth. The local corrected time 536 may also be used to facilitate time-based encryption protocols, such as the use of time varying cryptographic keys.

In some implementations, the secondary PPS system 176 may be in operation while the timing system 170 is in use. As a result, the secondary PPS system 176 is immediately ready to provide the secondary PPS signal 540 in the event of a failure of the primary PPS signal 508. In other implementations, the secondary PPS system 176 may be operated after failure of the primary PPS signal 508.

Figure 6:
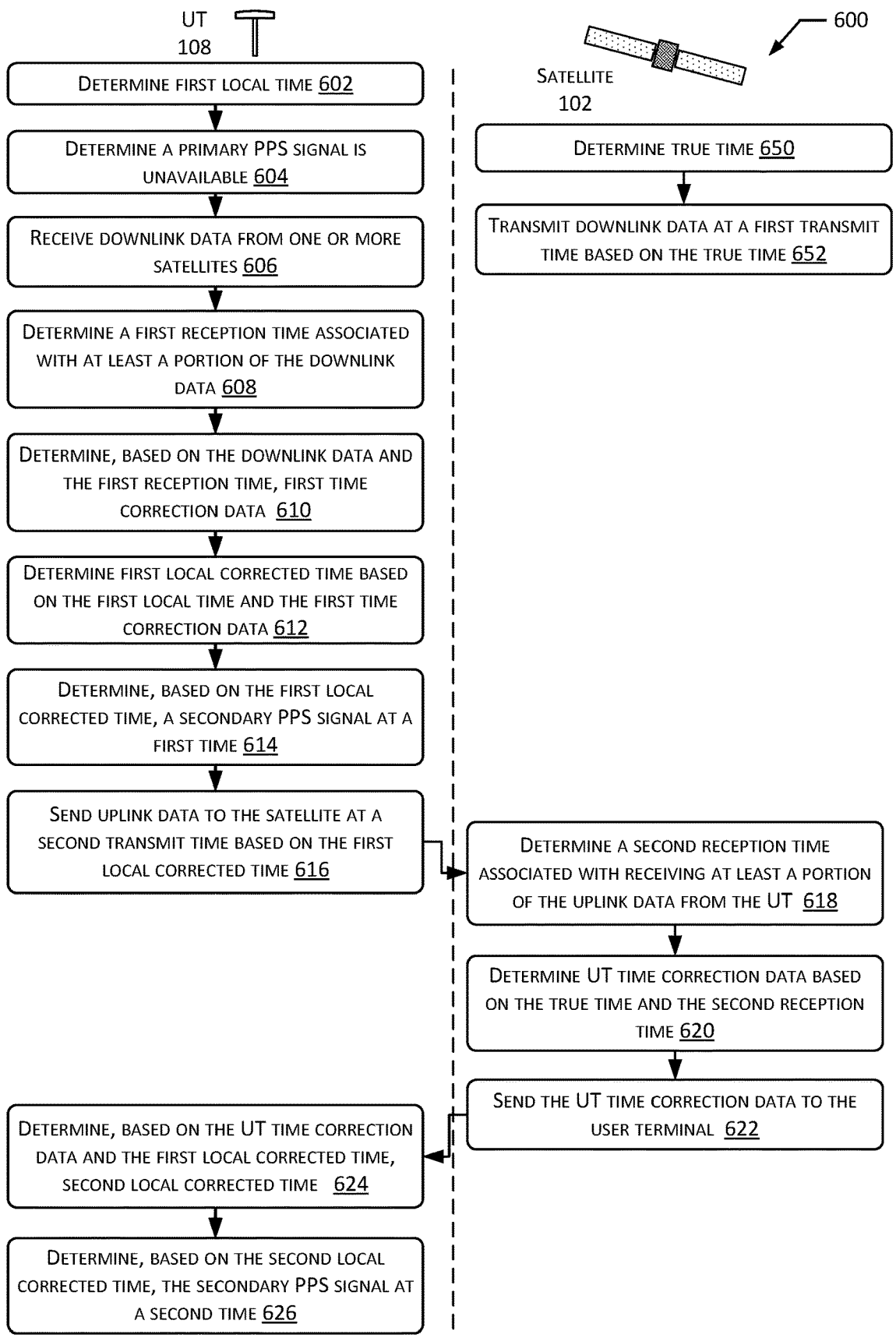
FIG. 6 is a flow diagram of a process to determine PPS timing, according to some implementations.

FIG. 6 is a flow diagram 600 of a process to determine PPS timing, according to some implementations. The process may be implemented by one or more of the UT 108, the satellite 102, the ground station 106, or other systems or devices.

At 602 a first local time 520(1) is determined. For example, the first local time 520(1) may be determined by disciplining the local clock 172 of the UT 108 based on the true time 506 and the primary PPS signal 508 provided by a GNSS receiver 158.

At 604 the primary PPS signal 508 is determined to be unavailable. The primary PPS signal 508 may be unavailable due to a failure of timing information from the GNSS receiver 158. The failure of the timing information may be based on one or more of: the GNSS receiver 158 determines an error state, the GNSS receiver 158 has received an error message, the GNSS receiver 158 is inoperable, the GNSS receiver 158 is unable to provide timing information with a specified precision, the GNSS receiver 158 detects interference, and so forth.

For example, the PPS selector system 178 may receive GNSS status data 160 that indicates an insufficient number of GNSS constellation 502 satellites are in view, a failure of the GNSS constellation, or other fault.

At 650 a satellite 102 determines true time 506. For example, the satellite 102 may use the GNSS receiver 158 to discipline the local clock 284 of the satellite 102 to true time 506.

At 652, downlink data 114 is transmitted. The downlink data 114 is transmitted at a first transmit time 404 that is based on the true time 506. As described above, the downlink data 114 may include the transmit time 404 data that indicates the true time 506 when the downlink data 114 was transmitted.

At 606 the downlink data 114 is received by the UT 108 from one or more satellites 606. For example, the UT 108 may receive downlink data 114 that is addressed to the UT 108 or to other UTs 108 that are within the same spot beam of an antenna 282 of the satellite 102.

At 608 a first reception time 504(1) is determined that is associated with at least a portion of the downlink data 114.

For example, the communication system 150 may provide the reception time 504 that a frame of downlink data 114 was received, based on output from the local clock 172.

At 610, based on at least a portion of the downlink data 114, and the first reception time 504(1), first time correction data 534(1) is determined. For example, the time correction data 534 may be determined based on the transmit time 404, the reception time 504, the distance delay 524, the atmospheric delay 528, the relativistic compensation 532, and so forth.

At 612 first local corrected time 536(1) is determined based on the first local time 520(1) and the first time correction data 534(1). For example, the first time correction data 534(1) and the first local time 520(1) may be summed.

At 614 a secondary PPS signal 540 is determined at a first time based on the first local corrected time 536(1). For example, the local clock 172, as corrected by the first time correction data 534(1), may be used to determine the secondary PPS signal 540.

Operations 602 through 614 may be deemed an "open loop" in that the UT 108 is operating based on information from the satellite 102 but has not yet communicated with the satellite 102. The downlink data 114 received by the UT 108 may be non-specific, that is not particularly tailored to the UT 108 or containing information that is specific or unique to the particular UT 108.

In comparison, the operations 616 through 626 introduce a "closed loop" process in which additional information obtained from another device is used to determine the local corrected time 536.

At 616 the UT 108 sends uplink data 112 to the satellite 102 at a second transmit time 452. The second transmit time 452 may be based on the first local corrected time 536(1). In one implementation, the uplink data 112 may include the second transmit time 452, indicative of when the uplink data 112 was sent by the UT 108, with respect to the local clock 172. For example, the transmit time 452 may be based on the first local corrected time 536(1). In another implementation the uplink data 112 may omit the second transmit time 452.

The uplink data 112 may also include a loss of time message 454. For example, a portion of the uplink header data 450 may be modified to indicate the timing system 170 of the UT 108 is not using the primary PPS signal 508.

At 618 the satellite 102 receives the uplink data 112 and determines a second reception time 504(2) that is associated with receiving at least a portion of the uplink data 112 from the UT 108. For example, the uplink receivers 280 may provide the second reception time 504(2) with respect to the local clock 284 disciplined to true time 506.

At 620 the UT time correction data 292 is determined based on the true time 506 of the local clock 284 and the second reception time 504(2). The second transmit time 452 may be inferred by the satellite 102. In some implementations, the UT 108 may determine and apply a correction factor to the time at which it transmits the uplink data 112, such that the uplink data 112 arrives at the satellite 102 at a specified time, such as the beginning of a timeslot. For example, the grant data 156 may specify a particular timeslot during which the UT 108 is authorized to transmit the uplink data 112. Based on this grant data 156 and the first local time, the UT 108 determines a transmit time such that the uplink data 112 will arrive at the satellite 108 at the start of the timeslot. Continuing the example, given the known grant data 156 or other information indicating a specific time allocated for the UT 108 to transmit the uplink data 112, upon receiving the uplink data 112 from the UT 108 during the timeslot, the satellite 102 may determine an inferred second transmit time 452. In implementations in which the uplink data 112 includes the second transmit time 452, the UT time correction data 292 may be determined based on the second transmit time 452.

The UT time correction data 292 may be determined using similar techniques to those used by the secondary PPS system 176 to determine the time correction data 534. For example, the UT time correction data 292 may be based on the distance delay 524, the atmospheric delay 528, and the relativistic compensation 532 that is associated with the uplink data 112 at the second transmit time 452. The UT time correction data 292 may be indicative of the deviation of the recovered local corrected time 536 with respect to the true time 506 as indicated by the local clock 284.

At 622 the satellite 102 sends the UT time correction data 292 to the UT 108. For example, the UT time correction data 292 may be included in downlink payload data 430 addressed to the particular UT 108.

At 624 second local corrected time 536(2) is determined based on the first local corrected time 536(1) and the UT time correction data 292. For example, the UT time correction data 292 may be summed to the first local corrected time 536(1) to calculate the second local corrected time 536(2).

At 626, based on the second local corrected time 536(2), the secondary PPS signal 540 is determined at a second time.

Other implementations are also available. In one implementation (not shown), operations 620 and 622 may be omitted and the second reception time 504(2) may be sent to the UT 108. Additional data such as a frame number or other information to associate the second reception time 504(2) with specific uplink data 112 may be sent to the UT 108 as well. The UT 108 may then use the known transmit time 452 and the second reception time 504(2) to determine an actual delay. This may then be compared to the estimated delay 302 and used to apply a correction factor.

Figure 7:
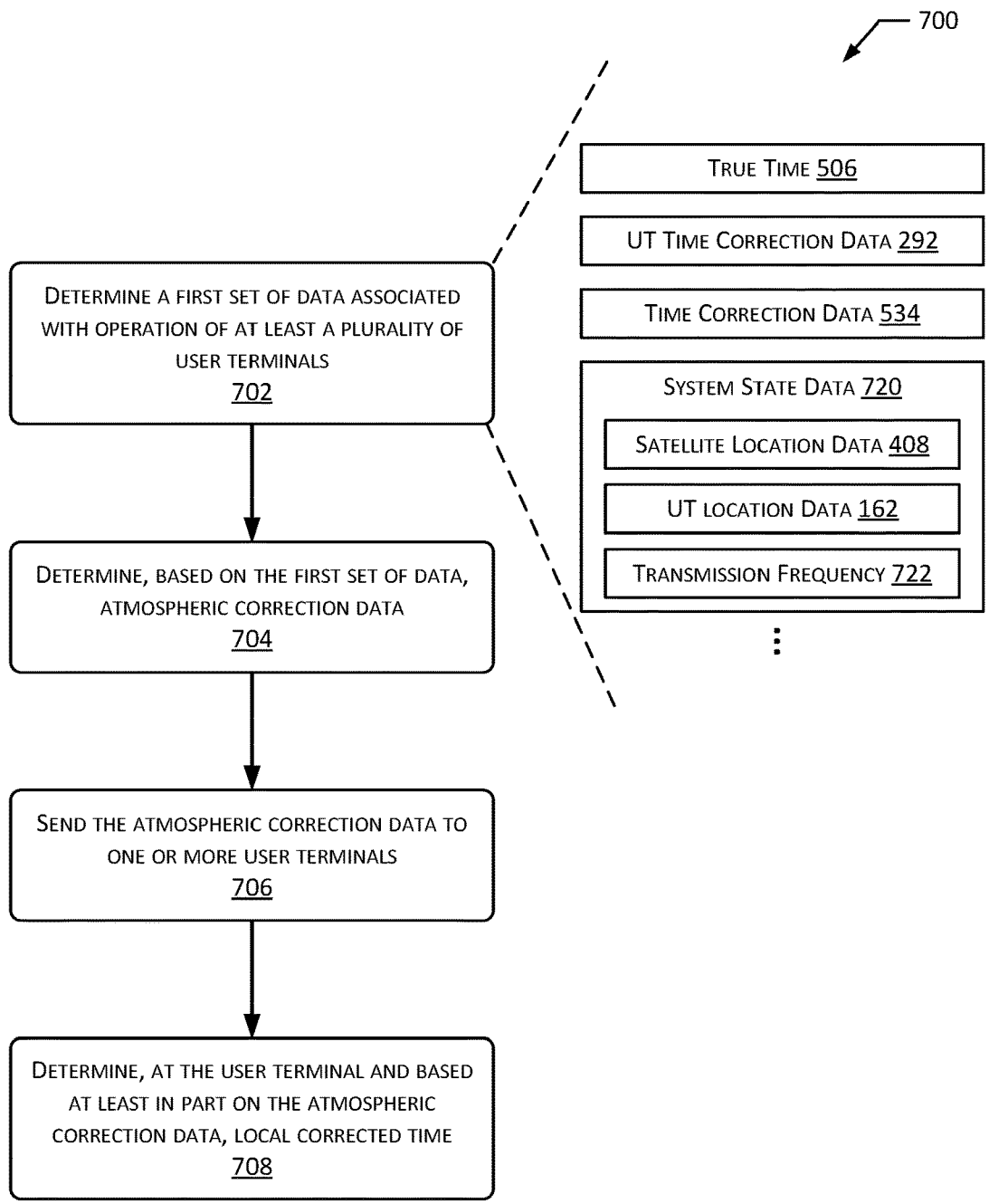
FIG. 7 is a flow diagram of determining and distributing atmospheric correction data, according to some implementations.

FIG. 7 is a flow diagram 700 of determining and distributing atmospheric correction data 294, according to some implementations. The large number of satellites 102 in the constellation and participating UTs 108 provides the ability to acquire a large set of data with respect to how the atmosphere affects the propagation of signals.

At 702, a first set of data associated with operation of at least a plurality of UTs 108 is determined. The first set of data may comprise one or more of true time 506 or local time 520, UT time correction data 292, time correction data 534, or system state data 720. The system state data 720 may comprise information such as the satellite location data 408, UT location data 162, transmission frequency 722, modulation, or other information.

At 704 atmospheric correction data 294 is determined based on the first set of data. For example, based on the known locations of several thousand UTs 108 distributed across a geographic area and a satellite 102 that is servicing those UTs 108 at a particular time, a detailed characterization of the atmosphere is obtained. This detailed characterization may then be used to determine the atmospheric correction data 294. The atmospheric correction data 294 may be determined for contemporaneous use, such as every few seconds, or may be stored and provides a historical data for later retrieval and usage. For example, the atmospheric correction data 294 may be determined based on a lookup given relative position of the sun with respect to the satellite 102 and the coverage area of the satellite 102, time of day, solar weather conditions, and so forth.

At 706 the atmospheric correction data 294 is sent to one more of UTs 108.

At 708, as described above, at one or more of the UTs 108, the secondary PPS system 176 or other systems may use this information to improve the accuracy of the local corrected time 536.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A user terminal (UT) comprising:
 a global navigation satellite system (GNSS) receiver;
 a clock;
 a communication system connected to a first antenna, wherein the communication system comprises a transmitter and a receiver; and
 a first set of one or more processors executing instructions to:
  determine a first location of the UT using the GNSS receiver;
  determine first true time based on timing information from the GNSS receiver,
 wherein the first true time represents a time standard selected for use;
  determine a first local time of the clock based on the first true time;
  determine a primary pulse per second (PPS) signal based on the first true time;
  operate the communication system based on the primary PPS signal;
  determine a failure associated with timing information from the GNSS receiver;
  receive downlink data from a first communication satellite, wherein the downlink data is indicative of a first transmit time of the downlink data;
  determine a first reception time associated with at least a portion of the downlink data;
  determine, based on the downlink data and the first reception time, first time correction data;
  determine first local corrected time based on the first local time and the first time correction data;
  determine, based on the first local corrected time, a secondary PPS signal; and
  operate the communication system based on the secondary PPS signal.

2. The UT of claim 1, wherein the downlink data comprises satellite location data indicative of a location of the first communication satellite; and
 wherein the first set of one or more processors further execute the instructions to:
  determine a first delay based on the first location and the satellite location data; and
  determine the first time correction data based on the first delay.

3. The UT of claim 1, wherein the first set of one or more processors further execute the instructions to:
 retrieve satellite location data indicative of a location of the first communication satellite; and
 determine the first time correction data based on the satellite location data.

4. The UT of claim 1, wherein the failure associated with the timing information from the GNSS receiver is based on one or more of:
 the GNSS receiver determining an error state,
 the GNSS receiver receiving an error message,
 the GNSS receiver being inoperable,
 the GNSS receiver being unable to provide timing information with a specified precision, or
 the GNSS receiver detecting interference.

5. The UT of claim 1, wherein the first set of one or more processors further execute the instructions to:
 send, using the communication system, uplink data to the first communication satellite;
 receive, from the first communication satellite, user terminal time correction data, wherein the user terminal time correction data is based on the uplink data; and
 determine, based on the first local corrected time and the user terminal time correction data, second local corrected time.

6. A system comprising:
a first device, the first device comprising:
a clock;
a transmitter;
a receiver; and
a first set of one or more processors executing instructions to:
determine a first time using the clock;
determine a first location of the first device;
receive first data from a second device, wherein the first data is indicative of a first transmit time of the first data;
determine a first reception time associated with at least a portion of the first data;
determine, based on the first data and the first reception time, first time correction data;
determine first corrected time based on the first time and the first time correction data;
determine a loss of timing information; and
based on the loss of timing information, operate the first device using the first corrected time.

7. The system of claim 6, wherein the first set of one or more processors further execute the instructions to:
determine, based on the first corrected time, a pulse per second (PPS) signal; and
operate one or more of the transmitter or the receiver based on the PPS signal.

8. The system of claim 6, the first device further comprising:
a global navigation satellite system (GNSS) receiver;
wherein the first set of one or more processors further execute the instructions to:
determine first true time based on timing information from the GNSS receiver, wherein the first true time represents a time standard selected for use;
determine a primary pulse per second (PPS) signal based on the first true time;
operate one or more of the transmitter or the receiver based on the primary PPS signal;
wherein the determination of the loss of timing information is based on a determination of one or more of:
the GNSS receiver is in an error state,
the GNSS receiver has received an error message,
the GNSS receiver is inoperable,
the GNSS receiver is unable to provide timing information with a specified precision, or
the GNSS receiver detects interference;
determine, based on the first corrected time, a secondary PPS signal; and
operate one or more of the transmitter or the receiver based on the secondary PPS signal.

9. The system of claim 6, wherein the first data comprises location data indicative of a second location of the second device;
wherein the first set of one or more processors further execute the instructions to:
determine a first delay based on the first location and the second location; and
determine the first time correction data based on the first delay.

10. The system of claim 9, wherein the first data comprises atmospheric correction data indicative of delays associated with radio transmissions transmitted by the second device; and
wherein the first set of one or more processors further execute the instructions to:
determine the first time correction data further based on the atmospheric correction data.

11. The system of claim 6, wherein the first set of one or more processors further execute the instructions to:
retrieve location data indicative of a second location of the second device; and
determine the first time correction data based on the second location.

12. The system of claim 6, wherein the first data comprises payload data addressed to a third device.

13. The system of claim 6, wherein the first set of one or more processors further execute the instructions to:
send, using the transmitter, second data to the second device;
receive, from the second device, second time correction data, wherein the second time correction data is based on the second data; and
determine, based on the first corrected time and the second time correction data, second corrected time.

14. The system of claim 6, the second device comprising:
a power system;
a maneuvering system;
a second transmitter;
a global navigation satellite system (GNSS) receiver; and
a second set of one or more processors executing instructions to:
determine the first transmit time based on timing information from the GNSS receiver; and
operate the second transmitter based on the timing information from the GNSS receiver, wherein the second transmitter transmits the first data.

15. The system of claim 6, the first device further comprising:
a power system; and
a maneuvering system; and
the second device comprising:
a second transmitter;
a second clock; and
a second set of one or more processors executing instructions to:
determine the first transmit time based on timing information from the second clock; and
operate the second transmitter based on the timing information from the second clock, wherein the second transmitter transmits the first data.

16. A computer-implemented method comprising:
determining a first time using a clock at a first device;
determining a first location of the first device;
receiving, at the first device, first data from a second device, wherein the first data is indicative of a first transmit time of the first data;
determining a first reception time associated with at least a portion of the first data;
determining, based on the first data and the first reception time, first time correction data;
determining a loss of timing information; and
based on the loss of timing information, determining first corrected time of the first device based on the first time and the first time correction data.

17. The computer-implemented method of claim 16, further comprising:
determining first true time based on timing information from a global navigation satellite system (GNSS) receiver, wherein the first true time represents a time standard selected for use;
determining a primary pulse per second (PPS) signal based on the first true time;

operating one or more of a transmitter or a receiver based on the primary PPS signal;

wherein the loss of the timing information represents a loss of the timing information from the GNSS receiver;

determining, based on the first corrected time, a secondary PPS signal; and operating one or more of the transmitter or the receiver based on the secondary PPS signal.

18. The computer-implemented method of claim 16, wherein the first data comprises location data indicative of a second location of the second device; and the method further comprising:

determining a first delay based on the first location and the second location; and determining the first time correction data based on the first delay.

19. The computer-implemented method of claim 18, wherein the first data comprises atmospheric correction data indicative of delays associated with radio transmissions transmitted by the second device; and the method further comprising:

determining the first time correction data based on the atmospheric correction data.

20. The computer-implemented method of claim 16, further comprising:

sending, using a transmitter of the first device, second data to the second device;

receiving, using a receiver of the first device, second time correction data from the second device, wherein the second time correction data is based on the second data; and determining, based on the first corrected time and the second time correction data, second corrected time of the first device.

* * * * *